United States Patent
Beck et al.

(10) Patent No.: US 12,428,105 B2
(45) Date of Patent: Sep. 30, 2025

(54) PLANETARY-TYPE BOTTOM-BRACKET TRANSMISSION FOR A BICYCLE OR A PEDELEC

(71) Applicant: ZF Friedrichshafen AG, Friedrichshafen (DE)

(72) Inventors: Stefan Beck, Eriskirch (DE); Michael Wechs, Weißensberg (DE); Fabian Kutter, Kressbronn (DE); Thomas Martin, Weissensberg (DE); Thomas Riedisser, Sigmarszell (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 18/944,536

(22) Filed: Nov. 12, 2024

(65) Prior Publication Data

US 2025/0153806 A1     May 15, 2025

(30) Foreign Application Priority Data

Nov. 13, 2023   (DE) .......................... 102023211231.0

(51) Int. Cl.
| | |
|---|---|
| *B62M 11/14* | (2006.01) |
| *B62J 45/411* | (2020.01) |
| *B62J 45/421* | (2020.01) |
| *B62M 6/55* | (2010.01) |
| *B62M 11/18* | (2006.01) |

(52) U.S. Cl.
CPC .......... *B62M 11/145* (2013.01); *B62J 45/411* (2020.02); *B62J 45/421* (2020.02); *B62M 6/55* (2013.01); *B62M 11/18* (2013.01)

(58) Field of Classification Search
CPC .. B62M 11/145; B62M 186/55; B62J 45/421; B62J 45/411
See application file for complete search history.

(56) References Cited

U.S. PATENT DOCUMENTS

| | | | |
|---|---|---|---|
| 10,995,827 B2* | 5/2021 | Ziemer | ..................... F16H 3/66 |
| 11,807,102 B2* | 11/2023 | Wechs | ................... B60K 17/06 |
| 2008/0121447 A1* | 5/2008 | Lang | ....................... B60K 6/48 |
| | | | 903/910 |

(Continued)

FOREIGN PATENT DOCUMENTS

| | | |
|---|---|---|
| DE | 102016225159 A1 | 6/2018 |
| DE | 102016225165 A1 | 6/2018 |
| DE | 102018208387 A1 | 11/2019 |

(Continued)

OTHER PUBLICATIONS

German Search Report for Application No. 102023211231.0 dated Jun. 19, 2024.

*Primary Examiner* — Huan Le
(74) *Attorney, Agent, or Firm* — Dority & Manning, P.A.

(57) ABSTRACT

A planetary-type bottom-bracket transmission for a bicycle or a pedelec includes a pedal crank shaft, a transmission output shaft, further shafts, and a first transmission shift group and a second transmission shift group. The first transmission shift group and the second transmission shift group are coupled to each other for implementing a plurality of gear ratios. The first transmission shift group includes a two-step stepped planetary gear set that is assigned a first shifting element, a second shifting element and a fifth shifting element.

13 Claims, 7 Drawing Sheets

(56) References Cited

U.S. PATENT DOCUMENTS

2024/0359775 A1* 10/2024 Ziemer ................... B62M 6/55

FOREIGN PATENT DOCUMENTS

| DE | 102019208536 | A1 | 12/2020 |
| DE | 102022203243 | B3 | 6/2023 |
| DE | 102016016003 | B3 | 8/2023 |
| DE | 102022207261 | B3 | 10/2023 |

* cited by examiner

| Gang (gear) | geschlossene Schaltelemente (engaged shifting elements) | | | | | |
|---|---|---|---|---|---|---|
| | B1 | B2 | B3 | B4 | $F1^I$-$F1^{VI}$ | $F2^I$-$F2^{VI}$ |
| G1 | | | | | X | X |
| G2 | X | | | | | X |
| G3 | | X | | | | X |
| G4 | | | | X | X | |
| G5 | X | | | X | | |
| G6 | | X | | X | | |
| G7 | | | X | | X | |
| G8 | X | | X | | | |
| G9 | | X | X | | | |

PLANETARY-TYPE BOTTOM-BRACKET TRANSMISSION FOR A BICYCLE OR A PEDELEC

CROSS-REFERENCE TO RELATED APPLICATION

The present application is related and has right of priority to German Patent Application No. DE102023211231.0 filed on Nov. 13, 2023, which is incorporated by reference in its entireties for all purposes.

TECHNICAL FIELD

The present invention relates generally to a planetary-type bottom-bracket transmission for a bicycle or a pedelec. The invention furthermore relates generally to a bicycle or pedelec having the bottom-bracket transmission.

BACKGROUND

Document DE 10 2022 203 243 B3, for example, has disclosed a transmission in a pedal crank casing for a bicycle or pedelec. The transmission includes a stepped planetary gear set and a further planetary gear set, which are arranged coaxially with respect to the pedal crank shaft and which are assigned six shifting elements for implementing six gear ratios.

SUMMARY

Example aspects of the present invention provide a bottom-bracket transmission and a bicycle or pedelec having the bottom-bracket transmission, which exhibit reduced structural complexity whilst having improved properties in relation to the prior art.

A planetary-type bottom-bracket transmission for a bicycle or a pedelec is thus provided. The bottom-bracket transmission has a pedal crank shaft as input, a transmission output shaft as output, and further shafts, wherein the output is preferably implemented via a sprocket, a belt pulley or the like. The bottom-bracket transmission furthermore includes a first transmission shift group and a second transmission shift group that are coupled to each other in order to implement a plurality of gear ratios, wherein the first transmission shift group includes a two-step stepped planetary gear set that is assigned a first shifting element, a second shifting element and a fifth shifting element, wherein the second transmission shift group includes a first planetary gear set and a second planetary gear set that are assigned a third shifting element, a fourth shifting element and a sixth shifting element, wherein a stepped planet gear carrier as an element of the stepped planetary gear set is connected to the pedal crank shaft or to a sixth shaft as output shaft of the second transmission shift group, wherein a ring gear as an element of the stepped planetary gear set is connected to a second element of the first planetary gear set or to the transmission output shaft, wherein a second sun gear as an element of the stepped planetary gear set is fixable to a casing by a first shifting element, wherein a first sun gear as an element of the stepped planetary gear set is fixable to the casing by a second shifting element, wherein, to interlock the stepped planetary gear set, two elements of the stepped planetary gear set, or two shafts of the stepped planetary gear set that are connected to elements, are connectable to each other by a fifth shifting element, wherein a first element of the first planetary gear set is connected to a first element of the second planetary gear set, wherein the first element of the first planetary gear set and the first element of the second planetary gear set are jointly connected to the stepped planet gear carrier of the stepped planetary gear set or to the transmission output shaft, wherein a third element of the first planetary gear set is fixable to the casing by a third shifting element, wherein a third element of the second planetary gear set is fixable to the casing by a fourth shifting element, wherein the third element of the first planetary gear set is connected to the second element of the second planetary gear set, and wherein, to interlock the first planetary gear set and the second planetary gear set, two shafts connected to elements of the first planetary gear set and of the second planetary gear set are connectable to each other by a sixth shifting element.

In this way, with the above-described connection of the first transmission shift group and the second transmission shift group in the bottom-bracket transmission having one provided stepped planetary gear set and two planetary gear sets and only six provided shifting elements, a particularly simple and compact construction is achieved in the bottom-bracket transmission. Particularly low component loads are furthermore achieved, along with advantageously high tooth meshing efficiency owing to the geometric transmission ratio series in the bottom-bracket transmission, by contrast to the known transmission.

For the mechanical connection of elements, for example rotary elements or the like, of the two planetary gear sets in the two transmission shift groups, use is preferably made not only of the input and output but also of further shafts or shaft-like elements, wherein the term "shaft" is to be understood not exclusively to mean a cylindrical, rotatably mounted machine element for transmitting torques but also to mean general connecting elements that connect the individual gear set elements to each other for the purposes of transmitting torque.

In the bottom-bracket transmission, the axial sequence of the two transmission shift groups can be interchanged. Accordingly, the first transmission shift group is connected upstream or downstream of the second transmission shift group between the transmission input shaft or the pedal crank shaft and the transmission output shaft of the bottom-bracket transmission. If the first transmission shift group is arranged upstream, the transmission input or pedal crank shaft, connected to the pedal crank, of the bottom-bracket transmission forms, as it were, the input shaft of the first transmission shift group, and the fifth shaft forms the output shaft of the first transmission shift group and is connected to the input of the second transmission shift group. It is possible for the pedal crank shaft and the first shaft to be formed as one part or as multiple parts. If the first transmission shift group is arranged downstream, the input shaft of the first transmission shift group is connected to the output of the second transmission shift group, and the fifth shaft of the first transmission shift group is connected to the transmission output shaft. It is possible for the transmission output shaft and the fifth shaft to be formed as one part or as multiple parts.

In the bottom-bracket transmission, any desired design of multi-step second transmission shift group may be combined with the first transmission shift group as bottom-bracket transmission. The second transmission shift group may preferably be designed as a three-ratio transmission or three-ratio group, and the first transmission shift group may be designed as a three-ratio transmission or three-ratio group, such that, for example, a nine-ratio transmission is implemented as a bottom-bracket transmission. It is however also possible for other numbers of gear ratios to be implemented in the transmission shift groups, such that the bottom-bracket transmission can also implement more or fewer than, for example, eight gear ratios. Depending on the constraints and requirements placed upon the bottom-bracket transmission, gear ratios may also be omitted. In this way, the gear set can be optimized for the required transmission ratios (ratio steps, spread etc.) or else for the nature of the shift operations, or the number of shifting elements involved.

In detail, for the connection of the two transmission shift groups, and to achieve a particularly simple and compact construction of the bottom-bracket transmission, it may be provided that the stepped planet gear carrier as an element of the stepped planetary gear set is connected to the pedal crank shaft or to the sixth shaft as output shaft of the second transmission shift group, that the ring gear as an element of the stepped planetary gear set is connected via a fifth shaft to the second element of the first planetary gear set or to the transmission output shaft, that the second sun gear as an element of the stepped planetary gear set is fixable to a casing via a first shaft when the first shifting element is engaged, that the first sun gear as an element of the stepped planetary gear set is fixable to the casing via a second shaft when the second shifting element is engaged, that, to interlock the stepped planetary gear set, two elements of the stepped planetary gear set are connectable to each other when the fifth shifting element is locked, that the first element of the first planetary gear set is connected to the first element of the second planetary gear set, that the first element of the first planetary gear set and the first element of the second planetary gear set are jointly connected to the stepped planet gear carrier of the stepped planetary gear set or to the transmission output shaft, that the third element of the first planetary gear set is fixable to the casing via a third shaft when the third shifting element is engaged, that the third element of the second planetary gear set is fixable to the casing via a fourth shaft when the fourth shifting element is engaged, that the third element of the first planetary gear set is connected via the third shaft to the second element of the second planetary gear set, and that, to interlock the first planetary gear set and the second planetary gear set, two shafts connected to elements of the first planetary gear set and of the second planetary gear set are connectable to each other when the sixth shifting element is locked.

Accordingly, in the two transmission shift groups of the bottom-bracket transmission, different interlocking variants of the stepped planetary gear set, by the fifth shifting element in six different arrangement variants, and of the two planetary gear sets, by the sixth shifting element in six different arrangement variants, are possible.

In the context of example aspects of the invention, in the bottom-bracket transmission having the two transmission shift groups, the shifting elements provided may be designed as brakes, freewheel brakes, clutches and/or freewheels. One advantageous design example variant of the invention provides that the first shifting element, the second shifting element, the third shifting element and the fourth shifting element are each designed as positively locking brakes, and/or that the fifth shifting element and the sixth shifting element are each designed as freewheels.

The shifting elements designed as brakes are preferably designed as positively locking shifting elements, for example as inexpensive brake or shift dogs or the like, for example as having a toothed brake ring and a corresponding pawl. Brakes as shifting elements have the advantage that they are readily accessible for external actuation. In the case of clutches designed as freewheels, it is advantageous if the brakes are for example designed as unidirectional brakes in order to prevent interlocking of the transmission in the event of a reversal of a direction of rotation at the input or at the output. As freewheels, use is preferably made of freewheels that are not actively switchable or actuatable. This has the advantage that no shifting actuation is required for the passive shifting elements. The non-actuatable freewheel transmits a torque when in the locking direction condition. No torque is transmitted in the opposite direction of rotation, because the freewheel does not lock when in the overrunning condition. It is however conceivable for actively switchable freewheels or actively switchable freewheel brakes to also be used.

One example embodiment of the invention may provide that at least one of the provided planetary gear sets is designed as a minus planetary gear set, resulting in a particularly space-saving arrangement. It is also conceivable for one of the planetary gear sets to be designed as a plus planetary gear set.

A minus planetary gear set can preferably be converted into a plus planetary gear set by virtue of the planet gear carrier connection and ring gear connection to said gear set being interchanged, and the value of the static transmission ratio being increased by one (1). A minus planetary gear set has planet gears mounted rotatably on the planet gear carrier, which planet gear mesh with the sun gear and the ring gear of said planetary gear set, such that, when the planet gear carrier is held fixed and the sun gear rotates, the ring gear rotates in the opposite direction to the direction of rotation of the sun gear. A plus planetary gear set has inner and outer planet gears mounted rotatably on the planet gear carrier, which inner and outer planet gears are in meshing engagement with one another, wherein the sun gear of said planetary gear set meshes with the inner planet gears and the ring gear of said planetary gear set meshes with the outer planet gears, such that, when the planet gear carrier is held fixed and the sun gear rotates, the ring gear rotates in the same direction of rotation as the direction of rotation of the sun gear.

For a person skilled in the art, this means that, in the case of the individual gear sets designed as minus planetary gear sets, a first element or gear set element is designed as a sun gear, a second element is designed as a planet gear carrier or spider, and a third element is designed as a ring gear. This furthermore means that, in the case of an individual gear set designed as a plus planetary gear set, the first element is designed as a sun gear, the second element is designed as a ring gear, and the third element is designed as a planet gear carrier or spider.

To further optimize the control of the bottom-bracket transmission, it is provided that at least one torque sensor or the like is provided at the input and/or at the output.

For the purposes of electrical drive assistance in the bottom-bracket transmission, at least one electric machine or the like may be connected or connectable, or fixedly or detachably coupled, to the input or to the pedal crank shaft or transmission input shaft and/or to the output or to the transmission output shaft. The electric machine may preferably be arranged axially parallel to the pedal crank shaft or transmission input shaft, whilst the planetary gear sets are arranged coaxially with respect to the pedal crank shaft or transmission input shaft.

A further example aspect of the present invention provides a bicycle or pedelec having the above-described bottom-bracket transmission. This yields the advantages and further advantages already described.

BRIEF DESCRIPTION OF THE DRAWINGS

Example aspects of the present invention will be discussed in more detail below on the basis of the drawings, in which.

DETAILED DESCRIPTION

Figure 1:
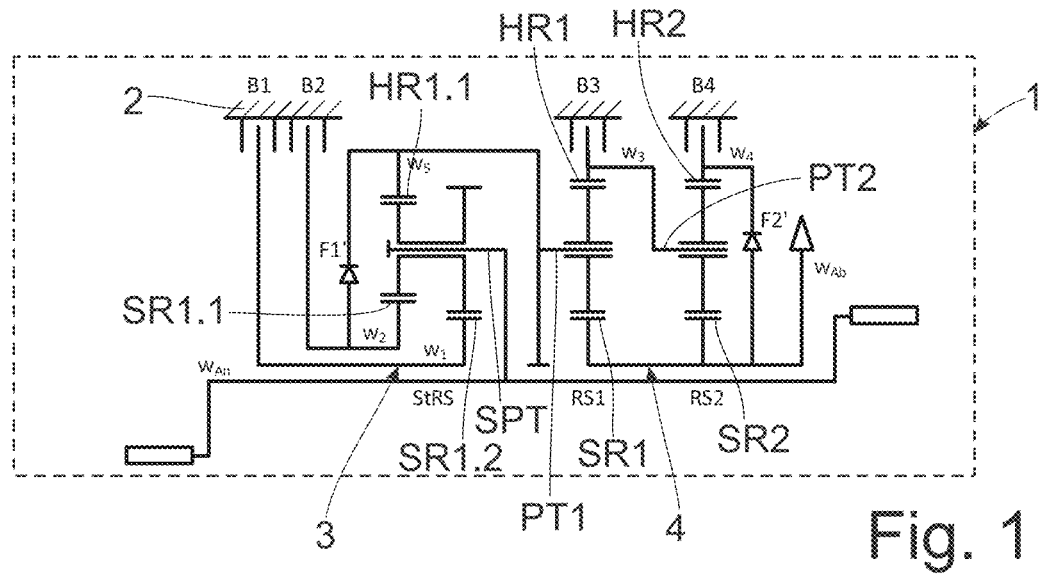
FIG. 1 shows a schematic diagrammatic view of a bottom-bracket transmission according to example aspects of the invention on a bicycle or a pedelec, having a first transmission shift group having a stepped planetary gear set with a first interlocking variant, said first transmission shift group being connected upstream of a second transmission shift group having two planetary gear sets with a first interlocking variant.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIGS. 1 to 18 illustrate, merely by way of example, various design variants and embodiments, and a shift diagram, of a planetary-type bottom-bracket transmission according to example aspects of the invention. FIG. 1 shows, by way of example, a merely schematically indicated bicycle or pedelec 1 having the bottom-bracket transmission.

The bottom-bracket transmission is illustrated in a casing or bottom-bracket casing 2 having a pedal crank with pedals as a pedal crank shaft WAn, wherein the pedal crank shaft WAn is connected to the input of one of the transmission shift groups 3, 4. The bottom-bracket transmission furthermore includes a transmission output shaft WAb as output, having a sprocket or belt pulley (not illustrated in any more detail) that is connected to the output of one of the transmission shift groups 3, 4. The bottom-bracket transmission includes a multi-ratio first transmission shift group 3 and a multi-ratio second transmission shift group 4, wherein the first transmission shift group 3 has a two-step stepped planetary gear set StRS that is assigned a first shifting element B1 as a positively locking brake, a second shifting element B2 as a positively locking brake, and a fifth shifting element $F1^I$, $F1^{II}$, $F1^{III}$, $F1^{IV}$, $F1^V$, $F1^{VI}$ as a freewheel, and wherein the second transmission shift group 4 has a first planetary gear set RS1 and a second planetary gear set RS2 that are assigned a third shifting element B3 as a positively locking brake, a fourth shifting element B4 as a positively locking brake, and a sixth shifting element $F2^I$, $F2^{II}$, $F2^{III}$, $F2^{IV}$, $F2^V$, $F2^{VI}$ as a freewheel. The two transmission shift groups 3, 4 form, as it were, two sub-transmissions which, in relation to the direction of power flow, can be interconnected in any desired sequence between pedal crank shaft WAn and transmission output shaft WAb.

Irrespective of the particular example design variant, it is provided in the bottom-bracket transmission that a stepped planet gear carrier SPT as an element of the stepped planetary gear set StRS1 is connected to the pedal crank shaft WAn or to a sixth shaft W6 as output shaft of the second transmission shift group 4, that a ring gear HR1.1 as an element of the stepped planetary gear set StRS is connected to a second element of the first planetary gear set RS1 or to the transmission output shaft WAb, that a second sun gear SR1.2 as an element of the stepped planetary gear set StRS is fixable to a casing 2 or to a static component or the like by a first shifting element B1, that a first sun gear SR1.1 as an element of the stepped planetary gear set StRS is fixable to the casing 2 by a second shifting element B2, that, to interlock the stepped planetary gear set StRS, two elements of the stepped planetary gear set StRS are connectable to each other by a fifth shifting element $F^I$, $F1^{II}$, $F1^{III}$, $F1^{IV}$, $F1^V$, $F1^{VI}$, $F1^{VII}$, $F1^{VIII}$, that a first element of the first planetary gear set RS1 is connected to a first element of the second planetary gear set RS2, that the first element of the first planetary gear set RS1 and the first element of the second planetary gear set RS2 are jointly connected to the stepped planet gear carrier SPT of the stepped planetary gear set StRS or to the transmission output shaft WAb, that a third element of the first planetary gear set RS1 is fixable to the casing 2 by a third shifting element B3, that a third element of the second planetary gear set RS2 is fixable to the casing 2 by a fourth shifting element B4, that the third element of the first planetary gear set RS1 is connected to the second element of the second planetary gear set RS2, and that, to interlock the first planetary gear set RS1 and the second planetary gear set RS2, two shafts connected to elements of the first planetary gear set RS1 and of the second planetary gear set RS2 are connectable to each other by a sixth shifting element $F2^I$, $F2^{II}$, $F2^{III}$, $F2^{IV}$, $F2^V$, $F2^{VI}$.

The planetary gear sets RS1, RS2 provided in FIGS. 1 to 13 and 15 to 18 are each designed as space-saving minus planetary gear sets. Here, in each of the planetary gear sets RS1, RS2, a sun gear SR1, SR2 is provided as first element, a spider or planet gear carrier PT1, PT2 is provided as second element, and a ring gear HR1, HR2 is provided as third element.

FIG. 1 illustrates a design variant of the bottom-bracket transmission in which the first transmission shift group 3 is connected upstream of the second transmission shift group 4. In detail, in the first design variant according to FIG. 1, it is provided that the stepped planet gear carrier SPT as an element of the stepped planetary gear set StRS1 is connected to the pedal crank shaft WAn, that the ring gear HR1.1 as an element of the stepped planetary gear set StRS is connected via a fifth shaft W5 as input shaft of the second transmission shift group 4 to the planet gear carrier PT1 of the first planetary gear set RS1, that the second sun gear SR1.2 as an element of the stepped planetary gear set StRS is fixable to the casing 2 via a first shaft W1 when the first shifting element B1 is engaged, that the first sun gear SR1.1 as an element of the stepped planetary gear set StRS is fixable to the casing 2 via a second shaft W2 when the second shifting element B2 is engaged, that, to interlock the stepped planetary gear set StRS in the context of a first interlocking variant, the ring gear HR1.1 connected to the fifth shaft W5 is connectable, when the fifth shifting element $F1^I$ in a first arrangement variant is locked, to the first sun gear SR1.1 of the stepped planetary gear set StRS, which first sun gear is connected to the second shaft W2, that the sun gear SR1 of the first planetary gear set RS1 is connected to the sun gear SR2 of the second planetary gear set RS2, that the sun gear SR1 of the first planetary gear set RS1 and the sun gear SR2 of the second planetary gear set RS2 are jointly connected to the transmission output shaft WAb, that the ring gear HR1 of the first planetary gear set RS1 is fixable to the casing 2 via a third shaft W3 when the third shifting element B3 is engaged, that the ring gear HR2 of the second planetary gear set RS2 is fixable to the casing 2 via a fourth shaft W4 when the fourth shifting element B4 is engaged, that the ring gear HR1 of the first planetary gear set RS1 is connected via the third shaft W3 to the planet gear carrier PT2 of the second planetary gear set RS2, and that, to interlock the first planetary gear set RS1 and the second planetary gear set RS2 in the context of a first interlocking variant, the fourth shaft W4 connected to the ring gear HR2 is connectable, when the sixth shifting element F21 in a first arrangement variant is locked, to the transmission output shaft WAb, which is connected to the first sun gear SR1 and to the second sun gear SR2.

Figure 2:
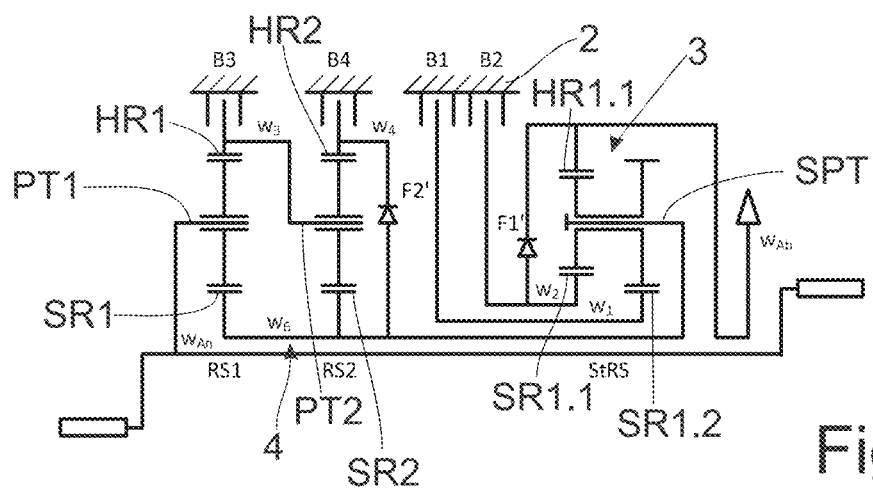
FIG. 2 shows a schematic diagrammatic view of the bottom-bracket transmission according to example aspects of the invention, having the first transmission shift group having the stepped planetary gear set with the first interlocking variant, said first transmission shift group being connected downstream of the second transmission shift group having two planetary gear sets with the first interlocking variant.

FIG. 2 illustrates a design variant of the bottom-bracket transmission in which the first transmission shift group 3 is connected downstream of the second transmission shift group 4. In detail, in the first design variant according to FIG. 2, it is provided that the stepped planet gear carrier SPT as an element of the stepped planetary gear set StRS1 is connected to the sixth shaft W6 as output shaft of the second transmission shift group 4, that the ring gear HR1.1 as an element of the stepped planetary gear set StRS is connected to the transmission output shaft WAb, that the second sun gear SR1.2 as an element of the stepped planetary gear set StRS is fixable to the casing 2 via the first shaft W1 when the first shifting element B1 is engaged, that the first sun gear SR1.1 as an element of the stepped planetary gear set StRS is fixable to the casing 2 via the second shaft W2 when the second shifting element B2 is engaged, that, to interlock the stepped planetary gear set StRS in the context of a first interlocking variant, the ring gear HR1.1 connected to the transmission output shaft WAb is connectable, when the fifth shifting element $F1^I$ in a first arrangement variant is locked, to the first sun gear SR1.1 of the stepped planetary gear set StRS, which first sun gear is connected to the second shaft W2, that the sun gear SR1 of the first planetary gear set RS1 is connected to the sun gear SR2 of the second planetary gear set RS2, that the sun gear SR1 of the first planetary gear set RS1 and the sun gear SR2 of the second planetary gear set RS2 are jointly connected to the stepped planet gear carrier SPT of the stepped planetary gear set StRS, that the ring gear HR1 of the first planetary gear set RS1 is fixable to the casing 2 via the third shaft W3 when the third shifting element B3 is engaged, that the ring gear HR2 of the second planetary gear set RS2 is fixable to the casing 2 via the fourth shaft W4 when the fourth shifting element B4 is engaged, that the ring gear HR1 of the first planetary gear set RS1 is connected via the third shaft W3 to the planet gear carrier PT2 of the second planetary gear set RS2, and that, to interlock the first planetary gear set RS1 and the second planetary gear set RS2 in the context of a first interlocking variant, the fourth shaft W4 connected to the ring gear HR2 is connectable, when the sixth shifting element F21 in a first arrangement variant is locked, to the sixth shaft W6, which is connected to the first sun gear SR1 and to the second sun gear SR2.

Figure 3:
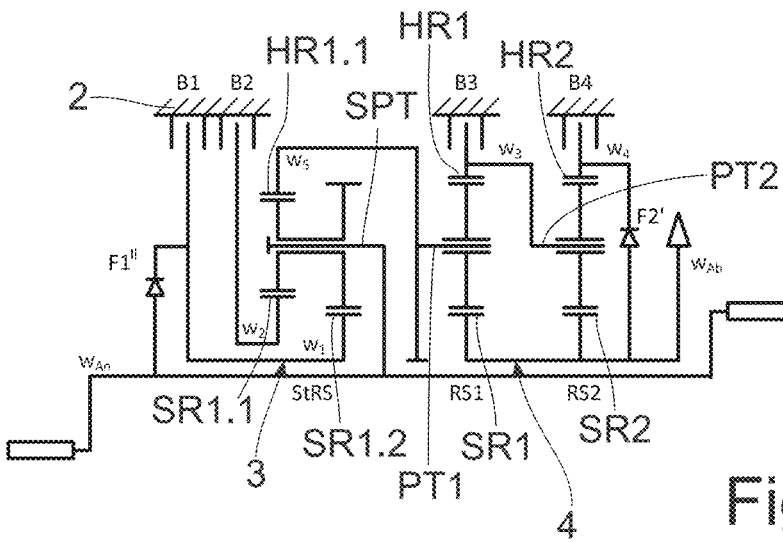
FIG. 3 shows a schematic diagrammatic view of the bottom-bracket transmission according to the invention, having the first transmission shift group having the stepped planetary gear set with a second interlocking variant, said first transmission shift group being connected upstream of the second transmission shift group having two planetary gear sets with the first interlocking variant.

FIG. 3 illustrates, by contrast to FIG. 1, a second interlocking variant of the stepped planetary gear set StRS in the first transmission shift group 3 connected upstream of the second transmission shift group 4. In the context of the second interlocking variant, when the fifth shifting element $F1^{II}$ in a second arrangement variant is locked, the second sun gear SR1.2 connected to the first shaft W1 is connected to the stepped planet gear carrier SPT of the first stepped planetary gear set StR1, which stepped planet gear carrier is connected to the pedal crank shaft WAn.

Figure 4:
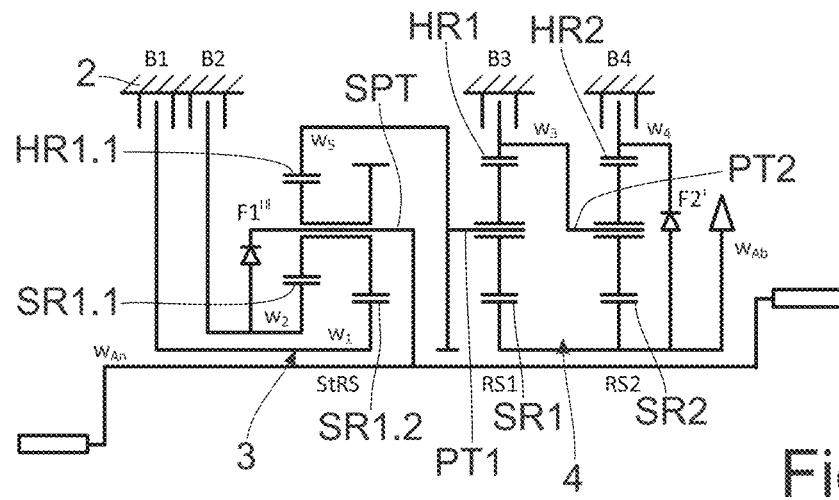
FIG. 4 shows a schematic diagrammatic view of the bottom-bracket transmission according to the invention, having the first transmission shift group having the stepped planetary gear set with a third interlocking variant, said first transmission shift group being connected upstream of the second transmission shift group having two planetary gear sets with the first interlocking variant.

FIG. 4 illustrates, by contrast to FIG. 1, a third interlocking variant of the stepped planetary gear set StRS in the first transmission shift group 3 connected upstream of the second transmission shift group 4. In the context of the third interlocking variant, when the fifth shifting element $F1^{III}$ in a third arrangement variant is locked, the first sun gear SR1.1 connected to the second shaft W2 is connected to the stepped planet gear carrier SPT of the first stepped planetary gear set StR1, which stepped planet gear carrier is connected to the pedal crank shaft WAn.

Figure 5:
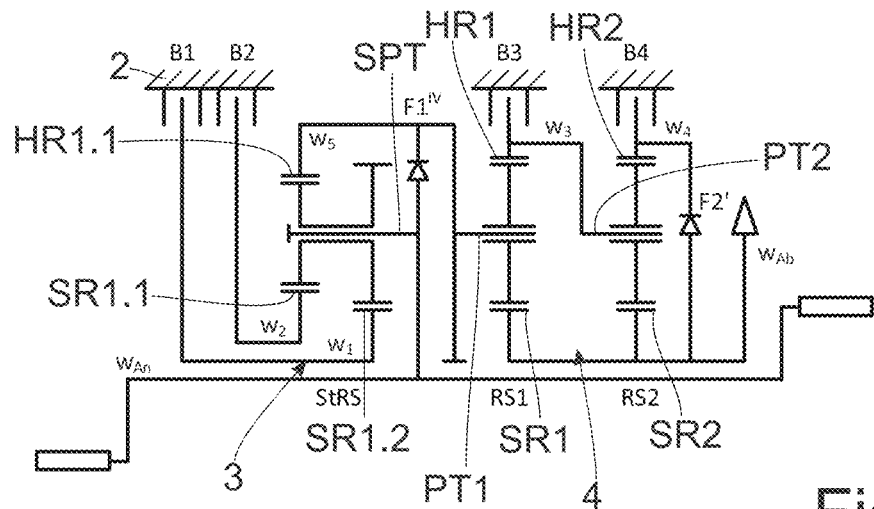
FIG. 5 shows a schematic diagrammatic view of the bottom-bracket transmission according to the invention, having the first transmission shift group having the stepped planetary gear set with a fourth interlocking variant, said first transmission shift group being connected upstream of the second transmission shift group having two planetary gear sets with the first interlocking variant.

FIG. 5 illustrates, by contrast to FIG. 1, a fourth interlocking variant of the stepped planetary gear set StRS in the first transmission shift group 3 connected upstream of the second transmission shift group 4. In the context of the fourth interlocking variant, when the fifth shifting element $F1^{IV}$ in a fourth arrangement variant is locked, the ring gear HR1.1 connected to the fifth shaft W5 is connected to the stepped planet gear carrier SPT of the first stepped planetary gear set StR1, which stepped planet gear carrier is connected to the pedal crank shaft WAn.

Figure 6:
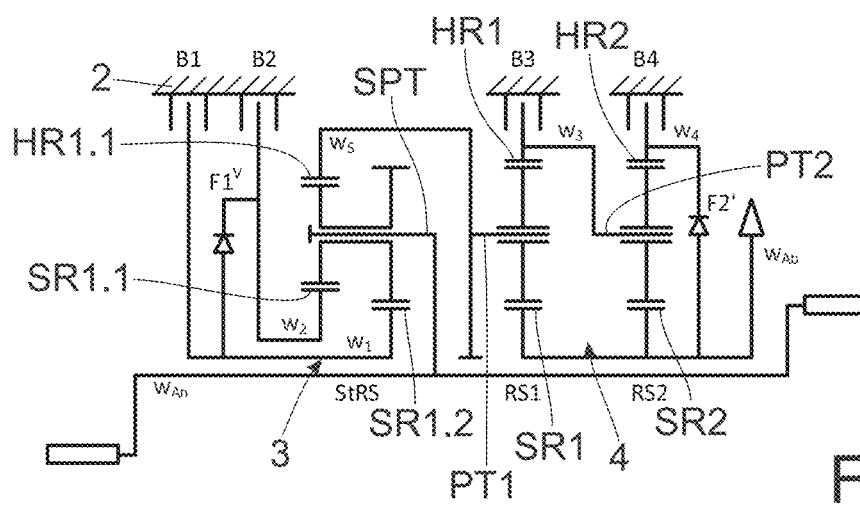
FIG. 6 shows a schematic diagrammatic view of the bottom-bracket transmission according to the invention, having the first transmission shift group having the stepped planetary gear set with a fifth interlocking variant, said first transmission shift group being connected upstream of the second transmission shift group having two planetary gear sets with the first interlocking variant.

FIG. 6 illustrates, by contrast to FIG. 1, a fifth interlocking variant of the stepped planetary gear set StRS in the first transmission shift group 3 connected upstream of the second transmission shift group 4. In the context of the fifth interlocking variant, when the fifth shifting element $F1^{V}$ in a fifth arrangement variant is locked, the second sun gear SR1.2 connected to the first shaft W1 is connected to the first sun gear SR1.1 of the first stepped planetary gear set StR1, which first sun gear is connected to the second shaft W2.

Figure 7:
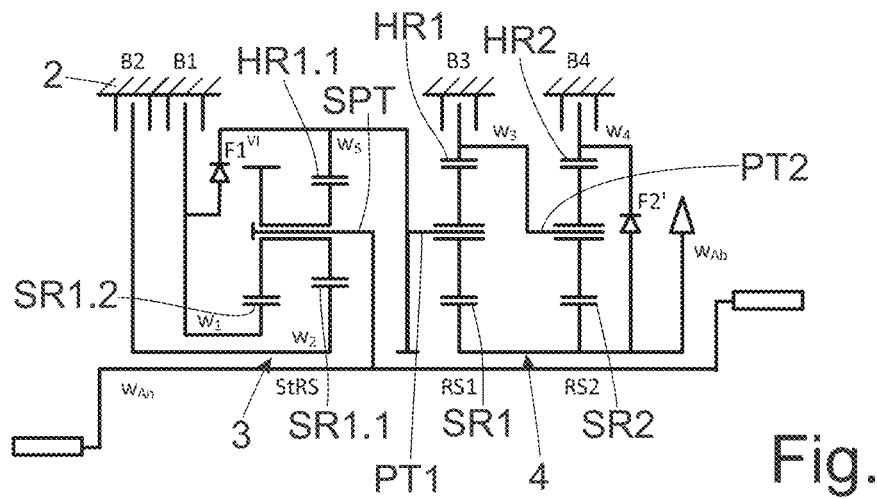
FIG. 7 shows a schematic diagrammatic view of the bottom-bracket transmission according to the invention, having the first transmission shift group having the stepped planetary gear set with a sixth interlocking variant, said first transmission shift group being connected upstream of the second transmission shift group having two planetary gear sets with the first interlocking variant.

FIG. 7 illustrates, by contrast to FIG. 1, a sixth interlocking variant of the stepped planetary gear set StRS1 in the first transmission shift group 3 connected upstream of the second transmission shift group 4. In the context of the sixth interlocking variant, when the fifth shifting element $F1^{VI}$ in a sixth arrangement variant is locked, the second sun gear SR1.2 connected to the first shaft W1 is connected to the ring gear HR1.1 of the first stepped planetary gear set StR1, which ring gear is connected to the fifth shaft W5.

Figure 8:
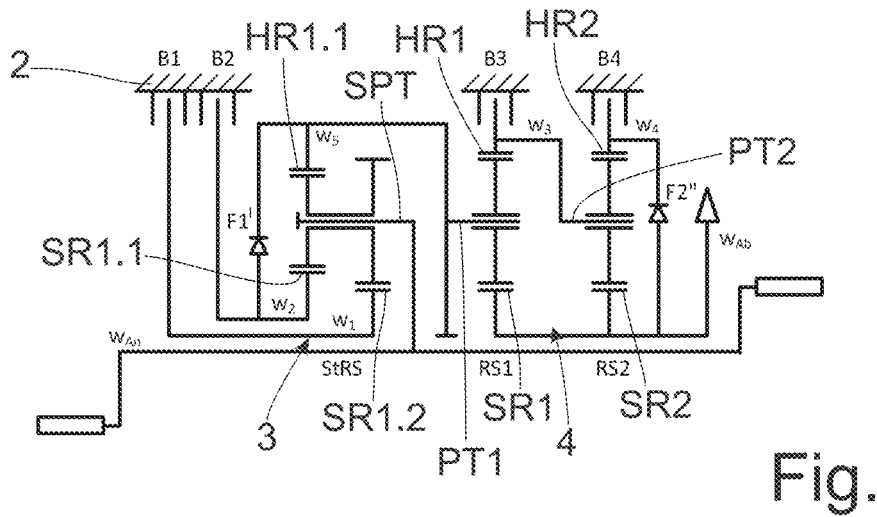
FIG. 8 shows a schematic diagrammatic view of the bottom-bracket transmission according to the invention, having the second transmission shift group having two planetary gear sets with a second interlocking variant, said second transmission shift group being connected downstream of the first transmission shift group having the stepped planetary gear set with the first interlocking variant.

FIG. 8 illustrates, by contrast to FIG. 1, a second interlocking variant of the first planetary gear set RS1 and planetary gear set RS2 in the second transmission shift group 4 connected downstream of the first transmission shift group 3. In the context of the second interlocking variant, when the sixth shifting element $F2^{II}$ in a second arrangement variant is locked, the third shaft W3 connected to the ring gear HR1 of the first planetary gear set RS1 and to the planet gear carrier PT2 of the second planetary gear set RS2 is connected to the transmission output shaft WAb, which is connected to the sun gear SR1 of the first planetary gear set RS1 and to the sun gear SR2 of the second planetary gear set RS2.

Figure 9:
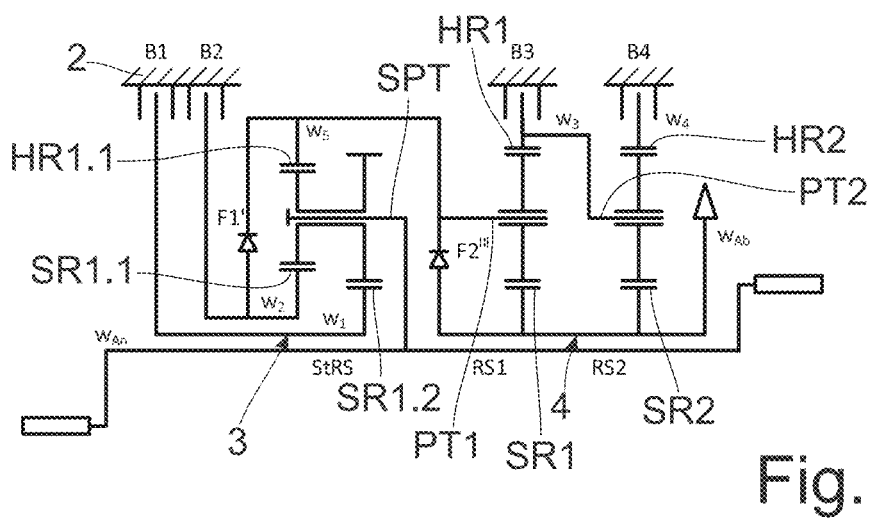
FIG. 9 shows a schematic diagrammatic view of the bottom-bracket transmission according to the invention, having the second transmission shift group having two planetary gear sets with a third interlocking variant, said second transmission shift group being connected downstream of the first transmission shift group having the stepped planetary gear set with the first interlocking variant.

FIG. 9 illustrates, by contrast to FIG. 1, a third interlocking variant of the first planetary gear set RS1 and planetary gear set RS2 in the second transmission shift group 4 connected downstream of the first transmission shift group 3. In the context of the third interlocking variant, when the sixth shifting element $F2^{III}$ in a third arrangement variant is locked, the fifth shaft W5 connected to the planet gear carrier PT1 of the first planetary gear set RS1 is connected to the transmission output shaft WAb, which is connected to the sun gear SR1 of the first planetary gear set RS1 and to the sun gear SR2 of the second planetary gear set RS2.

Figure 10:
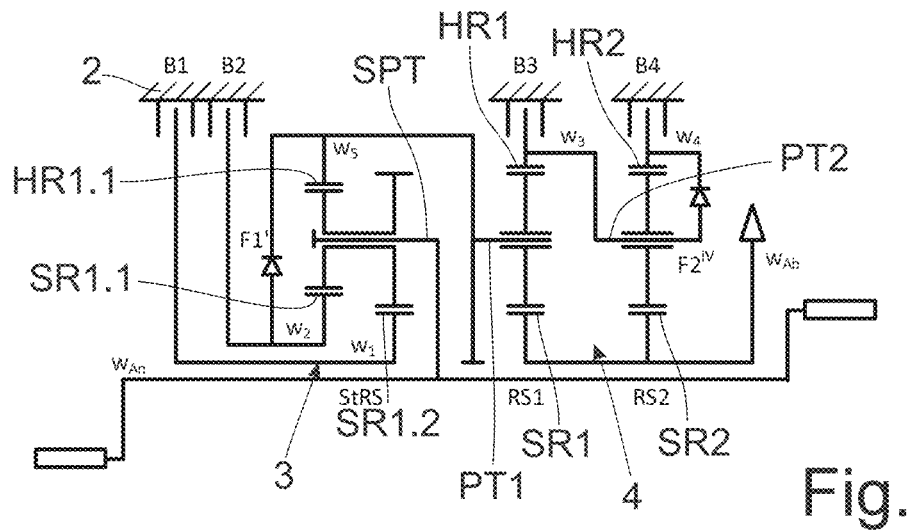
FIG. 10 shows a schematic diagrammatic view of the bottom-bracket transmission according to the invention, having the second transmission shift group having two planetary gear sets with a fourth interlocking variant, said second transmission shift group being connected downstream of the first transmission shift group having the stepped planetary gear set with the first interlocking variant.

FIG. 10 illustrates, by contrast to FIG. 1, a fourth interlocking variant of the first planetary gear set RS1 and planetary gear set RS2 in the second transmission shift group 4 connected downstream of the first transmission shift group 3. In the context of the fourth interlocking variant, when the sixth shifting element $F2^{IV}$ in a fourth arrangement variant is locked, the third shaft W3 connected to the ring gear HR1 of the first planetary gear set RS1 and to the planet gear carrier PT2 of the second planetary gear set RS2 is connected to the fourth shaft W4, which is connected to the ring gear HR2 of the second planetary gear set RS2.

Figure 11:
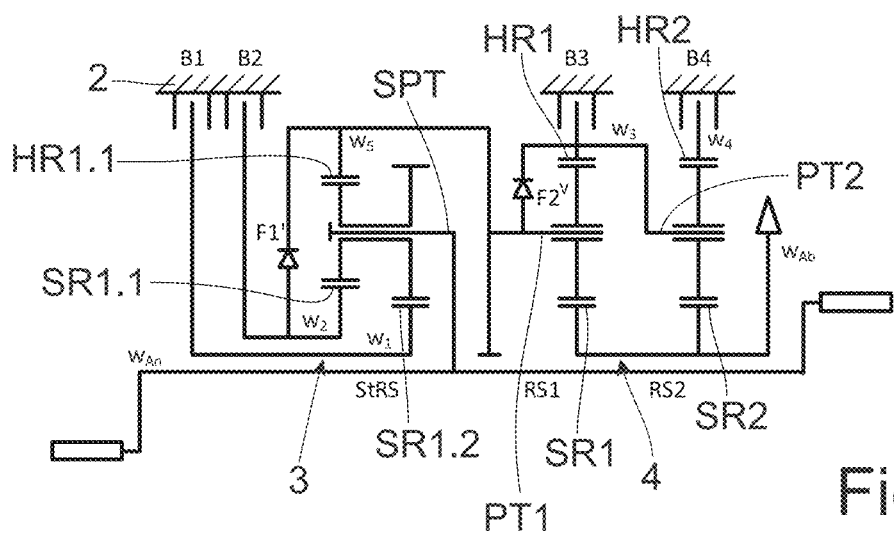
FIG. 11 shows a schematic diagrammatic view of the bottom-bracket transmission according to the invention, having the second transmission shift group having two planetary gear sets with a fifth interlocking variant, said second transmission shift group being connected downstream of the first transmission shift group having the stepped planetary gear set with the first interlocking variant.

FIG. 11 illustrates, by contrast to FIG. 1, a fifth interlocking variant of the first planetary gear set RS1 and planetary gear set RS2 in the second transmission shift group 4 connected downstream of the first transmission shift group 3. In the context of the fifth interlocking variant, when the sixth shifting element $F2^{V}$ in a fifth arrangement variant is locked, the third shaft W3 connected to the ring gear HR1 of the first planetary gear set RS1 and to the planet gear carrier PT2 of the second planetary gear set RS2 is connected to the fifth shaft W5, which is connected to the planet gear carrier PT1 of the first planetary gear set RS1.

Figure 12:
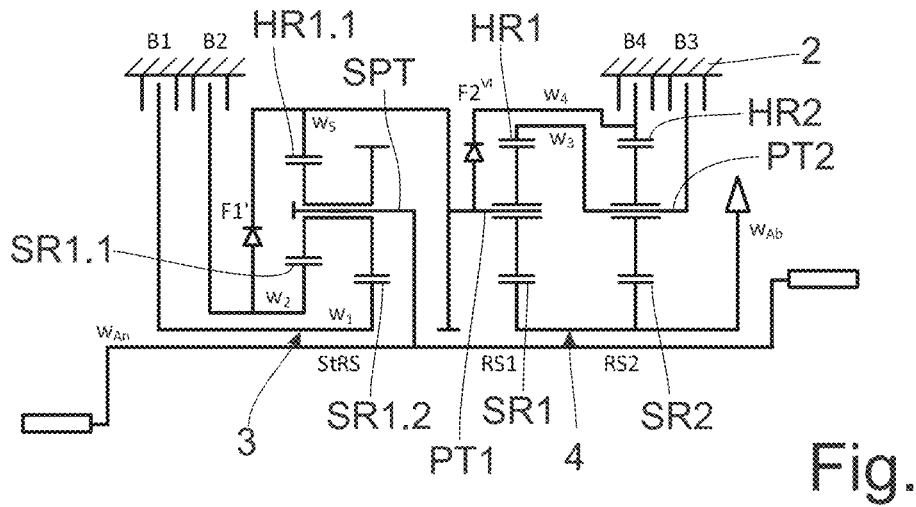
FIG. 12 shows a schematic diagrammatic view of the bottom-bracket transmission according to the invention, having the second transmission shift group having two planetary gear sets with a sixth interlocking variant, said second transmission shift group being connected downstream of the first transmission shift group having the stepped planetary gear set with the first interlocking variant.

FIG. 12 illustrates, by contrast to FIG. 1, a sixth interlocking variant of the first planetary gear set RS1 and planetary gear set RS2 in the second transmission shift group 4 connected downstream of the first transmission shift group 3. In the context of the sixth interlocking variant, when the sixth shifting element $F2^{VI}$ in a sixth arrangement variant is locked, the fourth shaft W4 connected to the ring gear HR2 of the second planetary gear set RS2 is connected to the fifth shaft W5, which is connected to the planet gear carrier PT1 of the first planetary gear set RS1.

Figures 13, 14:
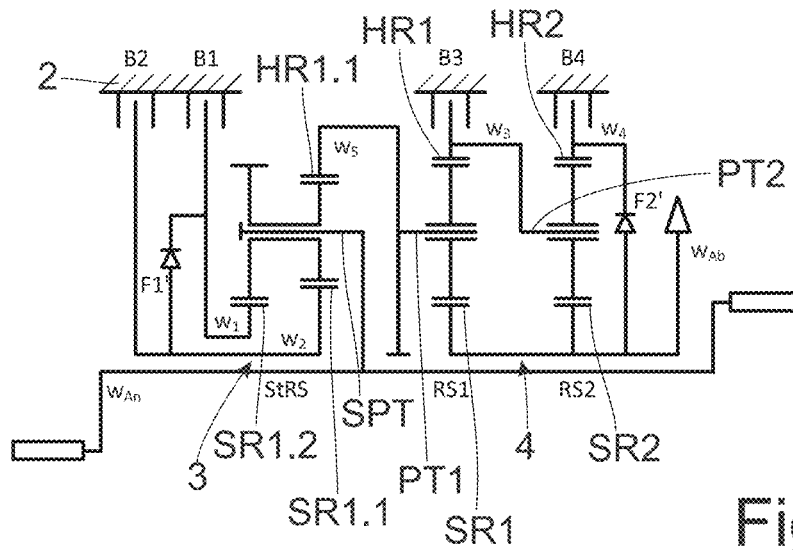
FIG. 13 shows a schematic diagrammatic view of the bottom-bracket transmission according to the invention, having the first transmission shift group with the stepped planets of the stepped planetary gear set illustrated in mirror-inverted form, said first transmission shift group being connected downstream of the second transmission shift group.
FIG. 14 shows a shift diagram with nine engageable gear ratios of the bottom-bracket transmission.

FIG. 13 illustrates, based on the embodiment according to FIG. 1, a mirror-inverted stepped planet in the stepped planetary gear set StRS, wherein the two steps of the stepped planet have been axially interchanged. This means that, viewed axially, the second sun gear SR1.2 is arranged in the first plane and the first sun gear SR1.1 is arranged with the ring gear HR1.1 in the second plane.

FIG. 14 shows a shift diagram for the bottom-bracket transmission having the first transmission shift group 3 as a three-ratio transmission and having the second transmission shift group 4 as a three-ratio transmission. This means that 3×3, that is to say nine, gear ratios G1, G2, G3, G4, G5, G6, G7, G8, G9 can be implemented. The shift diagram indicates the shifting elements B1, B2, B3, B4, F1$^{I}$, F1$^{II}$, F1$^{III}$, F1$^{IV}$, F1$^{V}$, F1$^{VI}$, F2$^{I}$, F2$^{II}$, F2$^{III}$, F2$^{IV}$, F2$^{V}$, F2$^{VI}$ used for each gear ratio G1, G2, G3, G4, G5, G6, G7, G8, G9. Here, for the freewheels F1$^{I}$, F1$^{II}$, F1$^{III}$, F1$^{IV}$, F1$^{V}$, F1$^{VI}$, F2$^{I}$, F2$^{II}$, F2$^{III}$, F2$^{IV}$, F2$^{V}$, F2$^{VI}$ as shifting elements, an X in the shift diagram means that the freewheels lock. This occurs automatically without external actuation. Furthermore, for a brake B1, B2, B3, B4 as a shifting element, an X in the shift diagram means that the brakes B1, B2, B3, B4 are engaged. This is performed by suitable actuator mechanism(s). Here, for the freewheels F1$^{I}$, F1$^{II}$, F1$^{III}$, F1$^{IV}$, F1$^{V}$, F1$^{VI}$, F2$^{I}$, F2$^{II}$, F2$^{III}$, F2$^{IV}$, F2$^{V}$, F2$^{VI}$, an empty field means that these do not lock. For the brakes B1, B2, B3, B4, an empty field means that these are disengaged.

In detail, it is apparent from the shift diagram according to FIG. 14 that, to implement or engage a first gear ratio G1, the fifth shifting element F1$^{I}$, F1$^{II}$, F1$^{III}$, F1$^{IV}$, F1$^{V}$, F1$^{VI}$, designed as a freewheel, and the sixth shifting element F2$^{I}$, F2$^{II}$, F2$^{III}$, F2$^{IV}$, F2$^{V}$, F2$^{VI}$, designed as a freewheel, lock; that, to implement a second gear ratio G2, the first shifting element B1, designed as a brake, is engaged and the sixth shifting element F2$^{I}$, F2$^{II}$, F2$^{III}$, F2$^{IV}$, F2$^{V}$, F2$^{VI}$, designed as a freewheel, locks; that, to implement a third gear ratio G3, the second shifting element B2, designed as a brake, is engaged and the sixth shifting element F2$^{I}$, F2$^{II}$, F2$^{III}$, F2$^{IV}$, F2$^{V}$, F2$^{VI}$, designed as a freewheel, locks; that, to implement a fourth gear ratio G4, the fourth shifting element B4, designed as a brake, is engaged and the fifth shifting element F1$^{I}$, F1$^{II}$, F1$^{III}$, F1$^{IV}$, F1$^{V}$, F1$^{VI}$, designed as a freewheel, locks; that, to implement a fifth gear ratio G5, the first shifting element B1, designed as a brake, and the fourth shifting element B4, designed as a brake, are engaged; that, to implement a sixth gear ratio G6, the second shifting element B2, designed as a brake, and the fourth shifting element B4, designed as a brake, are engaged; that, to implement a seventh gear ratio G7, the third shifting element B3, designed as a brake, is engaged and the fifth shifting element F1$^{I}$, F1$^{II}$, F1$^{III}$, F1$^{IV}$, F1$^{V}$, F1$^{VI}$, designed as a freewheel, locks; that, to implement an eighth gear ratio G8, the first shifting element B1, designed as a brake, and the third shifting element B3, designed as a brake, are engaged; and/or that, to implement a ninth gear ratio G9, the second shifting element B2, designed as a brake, and the third shifting element B3, designed as a brake, are engaged.

Figure 15:
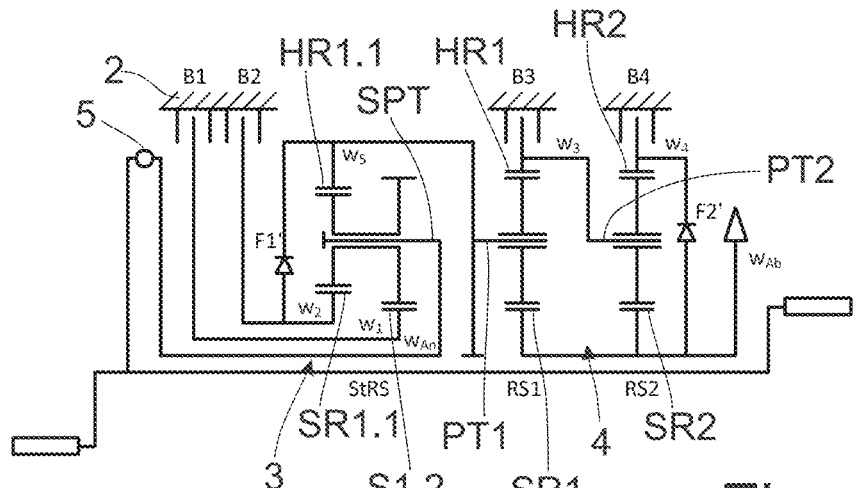
FIG. 15 shows a schematic diagrammatic view of the bottom-bracket transmission according to FIG. 1, with a torque sensor indicated by way of example at the input.

FIG. 15 shows an embodiment of the bottom-bracket transmission according to example aspects of the invention based on FIG. 1, wherein a torque sensor 5 is connected or connectable to the pedal crank shaft or to a transmission input shaft WAn. For example, a disc-shaped torque sensor 5 may be arranged at the transmission input. The torque sensor 5 may however also be of some other design.

Figure 16:
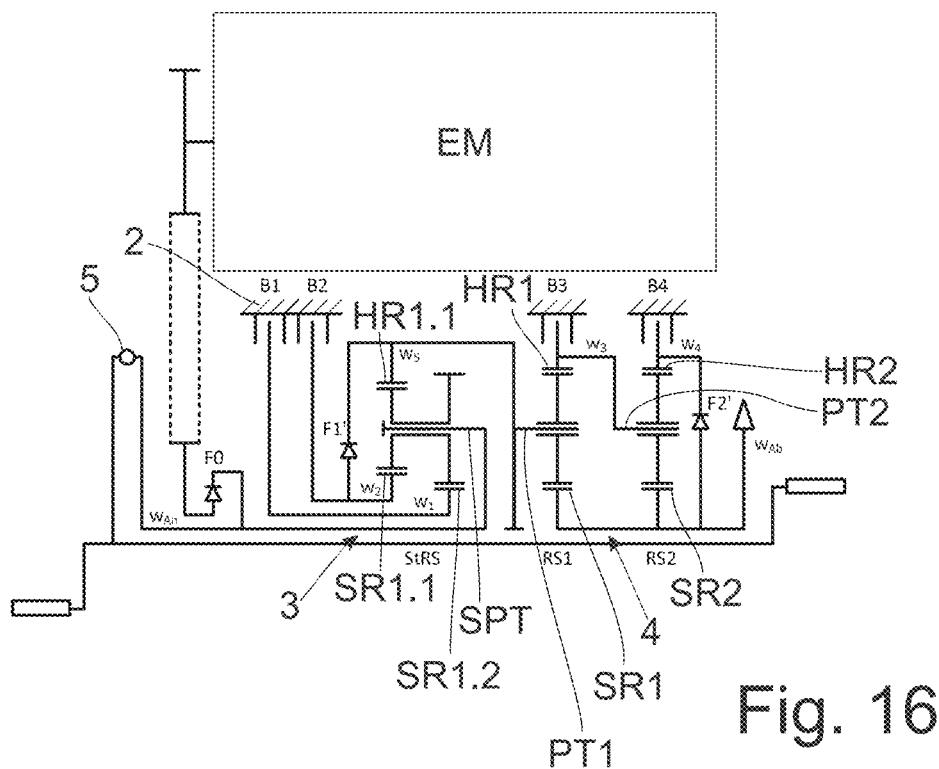
FIG. 16 shows a schematic diagrammatic view of the bottom-bracket transmission according to FIG. 15, with an electric machine arranged by way of example at the input.
Figure 17:
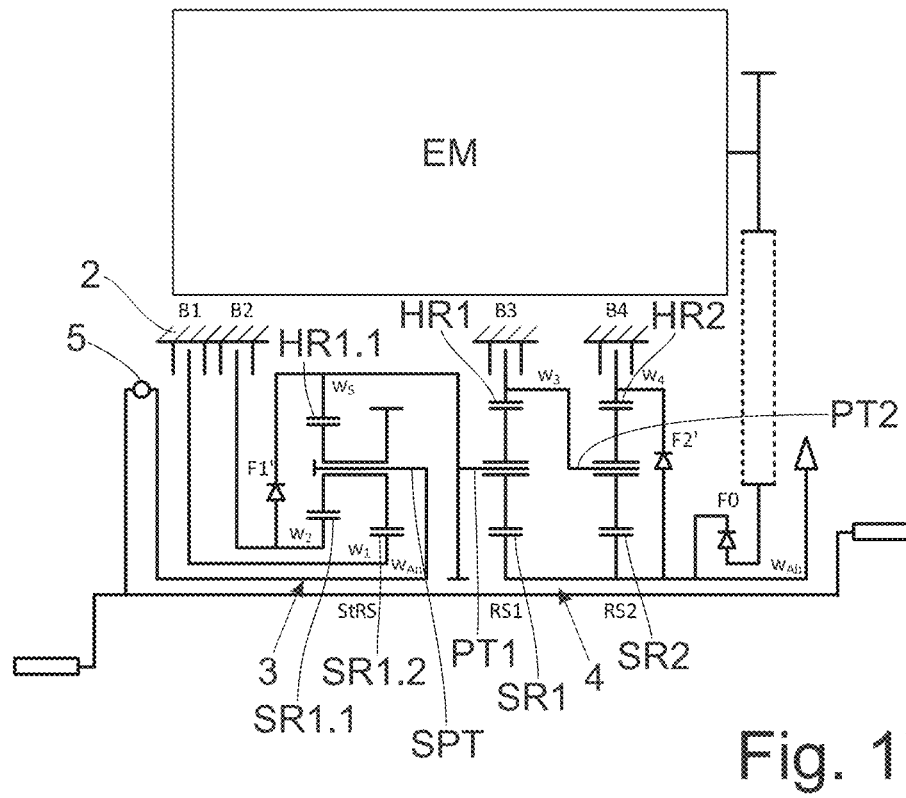
FIG. 17 shows a schematic diagrammatic view of the bottom-bracket transmission according to FIG. 15, with an electric machine arranged by way of example at the output.

FIGS. 16 and 17 each illustrate an embodiment of the bottom-bracket transmission according to example aspects of the invention based on FIG. 15, with an additional electric machine EM. The electric machine EM may be connected to the pedal crank shaft WAn, as indicated in FIG. 16. It is also conceivable for the electric machine EM to be connected to the transmission output shaft WAb, as shown in FIG. 17. The electric machine EM is preferably arranged axially parallel to the pedal crank shaft or transmission input shaft WAn. It would however also be possible for the electric machine EM to be arranged coaxially with respect to the pedal crank shaft. Irrespective of this, it is advantageous for the electric machine EM to be connected by a freewheel F0 or the like in order that, during operation without the electric machine EM, no losses arise as a result of the electric machine EM rotating concomitantly.

Figure 18:
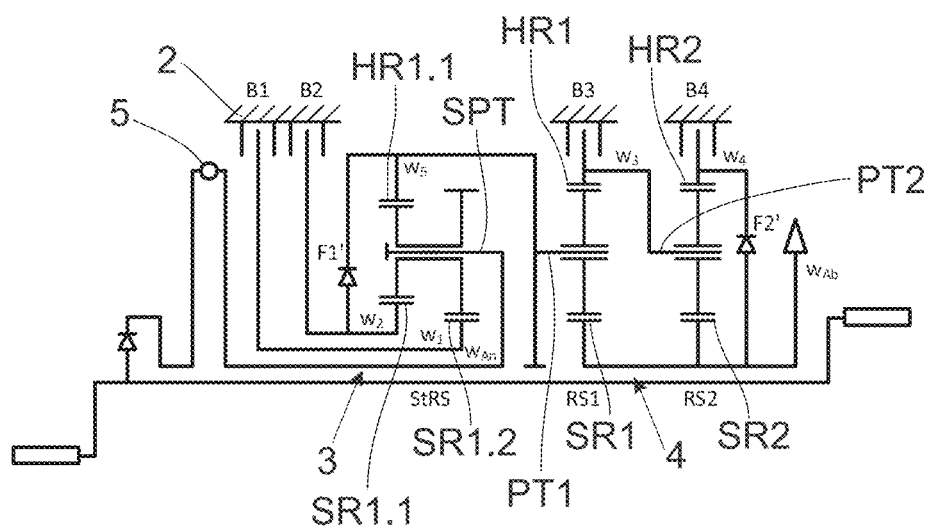
FIG. 18 shows a schematic diagrammatic view of the bottom-bracket transmission according to FIG. 15, with a freewheel upstream of the pedal crank shaft.

FIG. 18 illustrates an embodiment of the bottom-bracket transmission according to example aspects of the invention based on FIG. 15, with an additional freewheel F between the pedal crank and the transmission input of the bottom-bracket transmission. In this way, upon an interruption in pedalling, the freewheel can open and decouple the pedal crank from the inertial masses of the transmission gear set and in particular of the electric machine EM, such that no inertial forces are perceptible at the pedal.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE DESIGNATIONS

1 Bicycle or pedelec
2 Casing or bottom-bracket casing
3 First transmission shift group
4 Second transmission shift group
5 Torque sensor
EM Electric machine
F0 Freewheel for electric machine
F Additional freewheel
SR1 Sun gear of the first planetary gear set
PT1 Planet gear carrier of the first planetary gear set
HR1 Ring gear of the first planetary gear set
SR2 Sun gear of the second planetary gear set
PT2 Planet gear carrier of the second planetary gear set
HR2 Ring gear of the second planetary gear set
SR1.1 First sun gear, with relatively small number of teeth, of the stepped planetary gear set
SR1.2 Second sun gear, with relatively large number of teeth, of the stepped planetary gear set
HR1.1 Ring gear of the stepped planetary gear set
SPT Stepped planet gear carrier of the stepped planetary gear set
RS1 First planetary gear set
RS2 Second planetary gear set
StRS Stepped planetary gear set
WAn Transmission input shaft or pedal crank shaft
WAb Transmission output shaft
W1 First shaft
W2 Second shaft
W3 Third shaft
W4 Fourth shaft
W5 Fifth shaft
W6 Sixth shaft
G1 First gear ratio
G2 Second gear ratio
G3 Third gear ratio
G4 Fourth gear ratio
G5 Fifth gear ratio
G6 Sixth gear ratio
G7 Seventh gear ratio
G8 Eighth gear ratio
G9 Ninth gear ratio B1 First shifting element, designed as a brake
B2 Second shifting element, designed as a brake
B3 Third shifting element, designed as a brake
B4 Fourth shifting element, designed as a brake
$F1^I$ Fifth shifting element, designed as a freewheel, in a first arrangement position
$F1^{II}$ Fifth shifting element, designed as a freewheel, in a second arrangement position
$F1^{III}$ Fifth shifting element, designed as a freewheel, in a third arrangement position
$F1^{IV}$ Fifth shifting element, designed as a freewheel, in a fourth arrangement position
$F1^V$ Fifth shifting element, designed as a freewheel, in a fifth arrangement position
$F1^{VI}$ Fifth shifting element, designed as a freewheel, in a sixth arrangement position
$F2^I$ Sixth shifting element, designed as a freewheel, in a first arrangement position
$F2^{II}$ Sixth shifting element, designed as a freewheel, in a second arrangement position
$F2^{III}$ Sixth shifting element, designed as a freewheel, in a third arrangement position
$F2^{IV}$ Sixth shifting element, designed as a freewheel, in a fourth arrangement position
$F2^V$ Sixth shifting element, designed as a freewheel, in a fifth arrangement position
$F2^{VI}$ Sixth shifting element, designed as a freewheel, in a sixth arrangement position

The invention claimed is:

1. A planetary-type bottom-bracket transmission for a bicycle or a pedelec (1), comprising:
a pedal crank shaft (WAn) as an input;
a transmission output shaft (WAb) as an output;
a plurality of shafts (W1, W2, W3, W4, W5, W6); and
a first transmission shift group (3) and a second transmission shift group (4) that are coupled together to implement a plurality of gear ratios (G1, G2, G3, G4, G5, G6, G7, G8, G9, G10, G11, G12), the first transmission shift group (3) comprising a two-step stepped planetary gear set (StRS) assigned a first shifting element (B1), a second shifting element (B2), and a fifth shifting element (F1I, F1II, F1III, F1IV, F1V, F1VI), the second transmission shift group (4) comprising a first planetary gear set (RS1) and a second planetary gear set (RS2) assigned a third shifting element (B3), a fourth shifting element (B4), and a sixth shifting element (F2I, F2II, F2III, F2IV, F2V, F2VI),
wherein a stepped planet gear carrier (SPT) of the stepped planetary gear set (StRS1) is connected to the pedal crank shaft (WAn) or to a sixth shaft (W6) of the plurality of shafts as an output shaft of the second transmission shift group (4),
wherein a ring gear (HR1.1) of the stepped planetary gear set (StRS) is connected to a second element of the first planetary gear set (RS1) or to the transmission output shaft (WAb),
wherein a second sun gear (SR1.2) of the stepped planetary gear set (StRS) is fixable to a casing (2) by the first shifting element (B1),
wherein a first sun gear (SR1.1) of the stepped planetary gear set (StRS) is fixable to the casing (2) by the second shifting element (B2),
wherein, to interlock the stepped planetary gear set (StRS), two elements of the stepped planetary gear set (StRS) are connectable by the fifth shifting element (F1I, F1II, F1III, F1IV, F1V, F1VI),
wherein a first element of the first planetary gear set (RS1) is connected to a first element of the second planetary gear set (RS2),
wherein the first element of the first planetary gear set (RS1) and the first element of the second planetary gear set (RS2) are jointly connected to the stepped planet gear carrier (SPT) of the stepped planetary gear set (StRS) or to the transmission output shaft (WAb),
wherein a third element of the first planetary gear set (RS1) is fixable to the casing (2) by the third shifting element (B3),
wherein a third element of the second planetary gear set (RS2) is fixable to the casing (2) by the fourth shifting element (B4),
wherein the third element of the first planetary gear set (RS1) is connected to the second element of the second planetary gear set (RS2), and
wherein, to interlock the first planetary gear set (RS1) and the second planetary gear set (RS2), two shafts of the plurality of shafts connected to elements of the first planetary gear set (RS1) and of the second planetary gear set (RS2) are connectable by the sixth shifting element (F2I, F2II, F2III, F2IV, F2V, F2VI).

2. The bottom-bracket transmission of claim 1, wherein the first transmission shift group (3) is connected upstream or downstream of the second transmission shift group (4).

3. The bottom-bracket transmission of claim 1, wherein:
the stepped planet gear carrier (SPT) of the stepped planetary gear set (StRS1) is connected to the pedal crank shaft (WAn) or to the sixth shaft (W6) as the output shaft of the second transmission shift group (4);
the ring gear (HR1.1) of the stepped planetary gear set (StRS) is connected via a fifth shaft (W5) of the plurality of shafts to the second element of the first planetary gear set (RS1) or to the transmission output shaft (WAb);
the second sun gear (SR1.2) of the stepped planetary gear set (StRS) is fixable to the casing (2) via a first shaft (W1) of the plurality of shafts when the first shifting element (B1) is engaged;
the first sun gear (SR1.1) of the stepped planetary gear set (StRS) is fixable to the casing (2) via a second shaft (W2) of the plurality of shafts when the second shifting element (B2) is engaged;
to interlock the stepped planetary gear set (StRS), the two elements of the stepped planetary gear set (StRS) are connectable when the fifth shifting element (F1I, F1II, F1III, F1IV, F1V, F1VI) is locked;
the first element of the first planetary gear set (RS1) is connected to the first element of the second planetary gear set (RS2);
the first element of the first planetary gear set (RS1) and the first element of the second planetary gear set (RS2) are jointly connected to the stepped planet gear carrier (SPT) of the stepped planetary gear set (StRS) or to the transmission output shaft (WAb);
the third element of the first planetary gear set (RS1) is fixable to the casing (2) via a third shaft (W3) of the plurality of shafts when the third shifting element (B3) is engaged;
the third element of the second planetary gear set (RS2) is fixable to the casing (2) via a fourth shaft (W4) of the plurality of shafts when the fourth shifting element (B4) is engaged;
the third element of the first planetary gear set (RS1) is connected via the third shaft (W3) to the second element of the second planetary gear set (RS2); and to interlock the first planetary gear set (RS1) and the second planetary gear set (RS2), the two shafts (WAb, W3, W4, W5) connected to the elements of the first planetary gear set (RS1) and of the second planetary gear set (RS2) are connectable when the sixth shifting element (F2I, F2II, F2III, F2IV, F2V, F2VI) is locked.

4. The bottom-bracket transmission of claim 1, wherein one or both of:
the first shifting element (B1), the second shifting element (B2), the third shifting element (B3), and the fourth shifting element (B4) are each a respective positively locking brake; and
the fifth shifting element (F1I, F1II, F1III, F1IV, F1V, F1VI) and the sixth shifting element (F2I, F2II, F2III, F2IV, F2V, F2VI) are each a respective freewheel.

5. The bottom-bracket transmission of claim 1, wherein one or both of the first planetary gear set (RS1) and the second planetary gear set (RS2) is configured as a minus planetary gear set.

6. The bottom-bracket transmission of claim 5, wherein, for each minus planetary gear set, the first element is a respective sun gear (SR1, SR2), the second element is a respective planet gear carrier (PT1, PT2), and the third element is a respective ring gear (HR1, HR2).

7. The bottom-bracket transmission of claim 1, wherein one or both of the first planetary gear set (RS1) and the second planetary gear set (RS2) is configured as a plus planetary gear set.

8. The bottom-bracket transmission of claim 7, wherein, for each plus planetary gear set, the first element is a respective sun gear (SR1, SR2), the second element is a respective ring gear (HR1, HR2), and the third element is a respective planet gear carrier (PT1, PT2).

9. The bottom-bracket transmission of claim 1, further comprising a torque sensor (5) connected to the pedal crank shaft (WAn).

10. The bottom-bracket transmission of claim 1, further comprising an electric machine (EM) connected or connectable to the pedal crank shaft (WAn) or to the transmission output shaft (WAb).

11. The bottom-bracket transmission of claim 10, wherein the electric machine (EM) is arranged axially parallel to the pedal crank shaft (WAn).

12. The bottom-bracket transmission of claim 1, wherein one or more of:
to implement or engage a first gear ratio (G1), the fifth shifting element (F1I, F1II, F1III, F1IV, F1V, F1VI), configured as a freewheel, and the sixth shifting element (F2I, F2II, F2III, F2IV, F2V, F2VI), configured as a freewheel, are locked;
to implement a second gear ratio (G2), the first shifting element (B1), configured as a brake, is engaged and the sixth shifting element (F2I, F2II, F2III, F2IV, F2V, F2VI), configured as a freewheel, is locked;
to implement a third gear ratio (G3), the second shifting element (B2), configured as a brake, is engaged and the sixth shifting element (F2I, F2II, F2III, F2IV, F2V, F2VI), configured as a freewheel, is locked;
to implement a fourth gear ratio (G4), the fourth shifting element (B4), configured as a brake, is engaged and the fifth shifting element (F1I, F1II, F1III, F1IV, F1V, F1VI), configured as a freewheel, is locked;
to implement a fifth gear ratio (G5), the first shifting element (B1), configured as a brake, and the fourth shifting element (B4), configured as a brake, are engaged;
to implement a sixth gear ratio (G6), the second shifting element (B2), configured as a brake, and the fourth shifting element (B4), designed as a brake, are engaged;
to implement a seventh gear ratio (G7), the third shifting element (B3), configured as a brake, is engaged and the fifth shifting element (F1I, F1II, F1III, F1IV, F1V, F1VI), configured as a freewheel, is locked;
to implement an eighth gear ratio (G8), the first shifting element (B1), configured as a brake, and the third shifting element (B3), configured as a brake, are engaged; and
to implement a ninth gear ratio (G9), the second shifting element (B2), configured as a brake, and the third shifting element (B3), configured as a brake, are engaged.

13. A bicycle or pedelec (1), comprising the bottom-bracket transmission of claim 1.

* * * * *